Sept. 8, 1959    K. E. BUCKMAN    2,903,136
FLUID FILTERS
Filed March 14, 1955    2 Sheets-Sheet 1
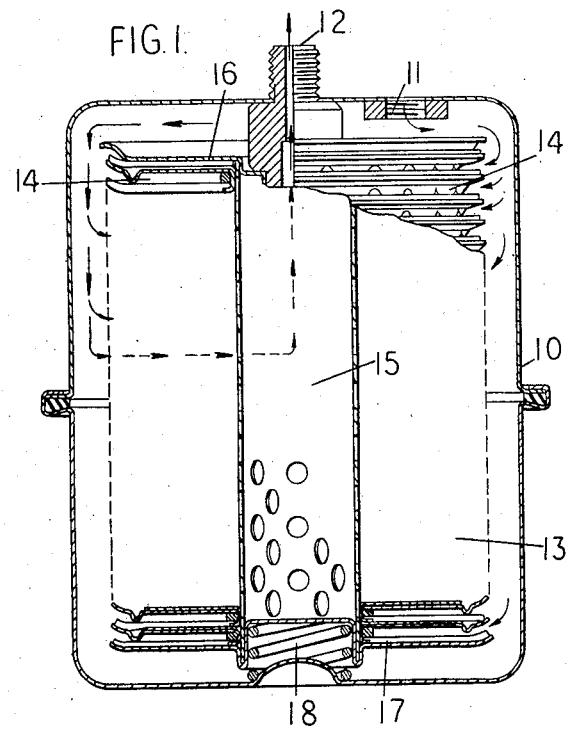
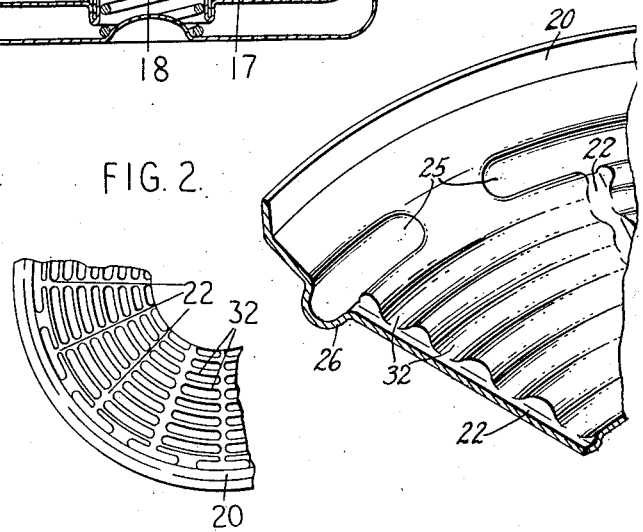
Inventor
Kenneth Ernest Buckman
By J. E. Jones, Attorney

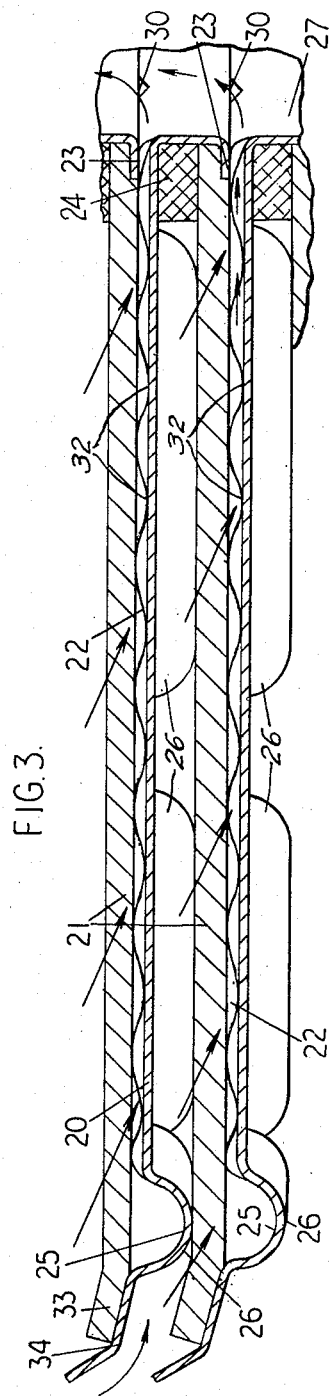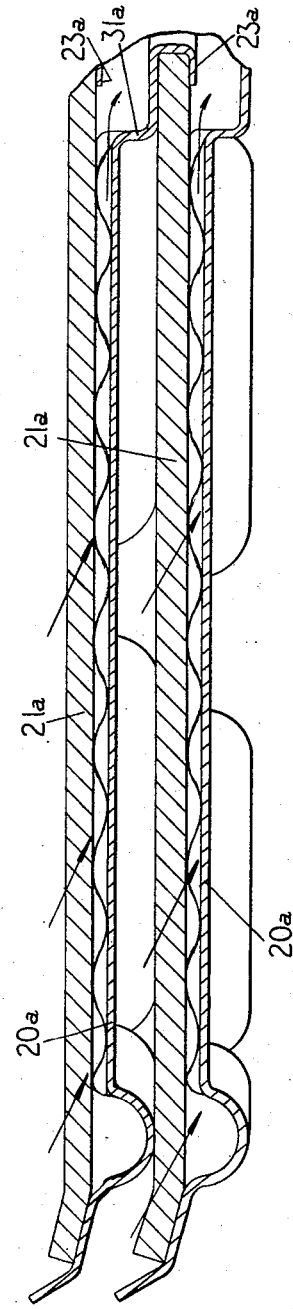

United States Patent Office 2,903,136
Patented Sept. 8, 1959

2,903,136

FLUID FILTERS

Kenneth Ernest Buckman, Redbridge, Southampton, England, assignor to General Motors Corporation, Detroit, Mich., a corporation of Delaware Application March 14, 1955, Serial No. 493,988

Claims priority, application Great Britain April 8, 1954

1 Claim. (Cl. 210—483)

This invention relates to the filtration of fluids and is particularly concerned with filters, for that purpose, incorporating sheet filter material.

Filters according to this invention are of particular utility for filtering oil on internal combustion engines.

By virtue of this invention there is no need to use sheet material which is unnecessarily robust and strong for filtration purposes, merely to withstand the necessary handling in the manufacture of the filter: all that is required is that the sheet material shall be sufficiently permeable to effect efficient filtration to the required degree.

According to the invention a filter element for a fluid filter comprises a centrally apertured permeable sheet and a centrally apertured non-permeable sheet mechanically sealed together at their inner peripheries, the outer peripheral part of said non-permeable sheet having indentations to space the sheets from each other and to provide a sealing contact with the outer periphery of the permeable sheet of an adjacent element when a plurality of such elements are coaxially aligned and clamped together. The permeable sheet of each element is adapted to be supported against flexure over the major part of its area by the non-permeable sheet of an adjacent element in such a way that the filtrate can pass between the adjacent surfaces.

Preferably the mechanical seal at the inner periphery is formed by turning the inner edge of the sheet of non-permeable material over the inner edge of the sheet of permeable material so as to clamp the sheets together in fluid-tight relationship. A washer can be interposed between the two sheets of each element at the inner peripheral part thereof.

The indentations in the non-permeable sheet can be, for example, of square or round cross-section and are such that the corresponding ridges on the opposite face of the sheet act to space the two sheets of each element and to transfer endwise pressure from each element to the next.

The shape of the sheets can be varied according to requirements: they can be of circular or elliptical annular form, or polygonal, square or rectangular for example.

The surface of the non-permeable sheet can be indented or grooved, either linearly or discretely, to facilitate the inter-surface flow of filtrate, subject to sufficient support against flexure of the permeable sheet. The grooves can be radial or circular or a combination thereof. As an alternative or a supplement to such grooving, the permeable material can itself be so formed.

To make a filter unit, several elements are stacked successively on top of one another; for example on a central rod or tube or like support, the arrangement being such that the filtrate passes towards the centre of the unit, and thence to the outlet. Alternatively the filter elements could be stacked within a tube such as a perforated metal container.

Elements of different permeabilities can be made, to effect fine or intermediate or coarse filtering; and elements of such different permeabilities can be stacked or used together to effect varied filtration simultaneously.

The materials of the non-permeable and permeable sheets are preferably sheet metal such as aluminium or tin plate, and paper respectively. The paper can be impregnated, as with a resin. The paper can, as indicated above, be indentated or grooved, or it can be creped.

The scope of the invention is defined in the appended claim; and how it can be carried into effect is hereinafter particularly described with reference to the drawings accompanying the provisional specification in which:

Figure 1 is a part sectional elevation of an oil filter embodying filter elements according to the invention;

Figure 2 is an enlarged plan of part of one non-permeable element of the filter of Figure 1;

Figure 2a is a perspective view of a portion of one non-permeable element shown in Figures 1 and 2;

Figure 3 is an enlarged section of part of the filter unit of the filter, showing the details of construction of filter elements; and Figure 4 is a similar view showing a modified filter element.

In Figure 1 is shown an oil filter which comprises an outer casing 10 having an oil inlet 11 and an oil outlet 12. Within the casing 10 is a filter unit 13 formed of a plurality of filter elements 14 stacked on a central longitudinal apertured supporting tube 15 and compressed between end plates 16 and 17 by a coil spring 18.

Each element 14 consists of an annular aluminium sheet 20 (Figures 2, 2a and 3) and an annular resin impregnated sheet 21. In the surface of the aluminium sheet 20 are formed spaced radial grooves 22 intersected by arcuate grooves 32. The inner peripheries of the sheets 20 and 21 are united by clamping sheet 20 over sheet 21 as at 23. A washer 24 is interposed between the sheets 20 and 21 at the inner peripheries thereof. Adjacent the outer periphery of sheet 21 the sheet 20 is formed with indentations 25 of substantially semi-circular cross section. The ridge 26 corresponding to each indentation 25 serves to space the sheets 21 and 20. Being under compression, adjacent sheets 21 and 20 of adjacent elements 14 are sealed at their outer peripheral parts 33 and 34 respectively.

As is shown by the arrows in Figures 1, 2 and 3 oil entering the inlet 11 flows through the permeable sheets 21 into the grooves 32 and 22, radially inwardly through the grooves 22 and apertures 30 at the ends of grooves 22 into spaces 27, and then longitudinally through the tube 15 to oil outlet 12.

In Figure 4 is shown a modified form of filter element having an annular metal sheet 20a and an annular paper sheet 21a. In this modification the metal sheet 20a is formed with an annular spacer part 31a in addition to a clamping part 23a, so that the use of a washer to space the permeable and non-permeable sheets is rendered unnecessary.

I claim:

In a filter for fluids, a casing, a stack of coaxially aligned filter elements compressed in said casing, and means to maintain the elements in alignment; each of said elements comprising a permeable sheet and a non-permeable metal sheet; said sheets of each element having central apertures, the inner margin of said metal sheet being crimped over the inner edge of said permeable sheet to seal said sheets together at their inner peripheries; said metal sheet having a series of arcuate depressions around the outer periphery thereof to space said metal sheet from said permeable sheet; each element having an unobstructed chamber defined by said sheets, by said series of depressions, and by said sealed central apertures; gaps between said depressions to provide inlet passages to said chamber; raised projections on said metal sheet for directly supporting the permeable sheet of the adjacent element;

interconnected arcuate and radial grooves defined by the walls of said projections and communicating with said central apertures; the exterior margin of each sheet in each element surrounding and extending substantially beyond said projections and depressions, and directly contacting a sheet in an adjacent element to form an annular peripheral seal whereby oil may be constrained to pass through the permeable sheet of each element from said inlet passages and subsequently be discharged by way of said grooves and central apertures, said depressions of the metal sheet directly exerting compressive force against the permeable sheet to insure the seal; and the said exterior margin and the outer edge of the permeable sheet of each of said elements being exposed to said fluid as the latter enters the stack.

References Cited in the file of this patent

UNITED STATES PATENTS

| | | |
|---|---|---|
| Re. 13,053 | Paul | Dec. 7, 1909 |
| 2,278,453 | Kracklauer | Apr. 7, 1942 |
| 2,345,014 | Stamsvik | Mar. 28, 1944 |
| 2,444,147 | Walton | June 29, 1948 |
| 2,452,486 | O'Meara | Oct. 26, 1948 |
| 2,624,465 | Kracklauer | Jan. 6, 1953 |
| 2,754,973 | Muller | July 17, 1956 |

FOREIGN PATENTS

| | | |
|---|---|---|
| 491,731 | Italy | Mar. 11, 1954 |